James A. Sinclair's Imp't in Animal Trap.

PATENTED
FEB 18 1868

74617

Witnesses.
Theo. Tusche
J. A. Servie

Inventor.
James A. Sinclair
Per Munn &
Attorneys

UNITED STATES PATENT OFFICE.

JAMES A. SINCLAIR, OF WOODSFIELD, OHIO.

IMPROVEMENT IN ANIMAL-TRAPS.

Specification forming part of Letters Patent No. 74,617, dated February 18, 1868.

*To all whom it may concern:*

Be it known that I, JAMES A. SINCLAIR, of Woodsfield, in the county of Monroe and State of Ohio, have invented a new and useful Improvement in Animal-Trap; and I do hereby declare that the following is a full, clear, and exact description thereof, which will enable others skilled in the art to make and use the same, reference being had to the accompanying drawings, forming part of this specification, in which—

Figure 1:
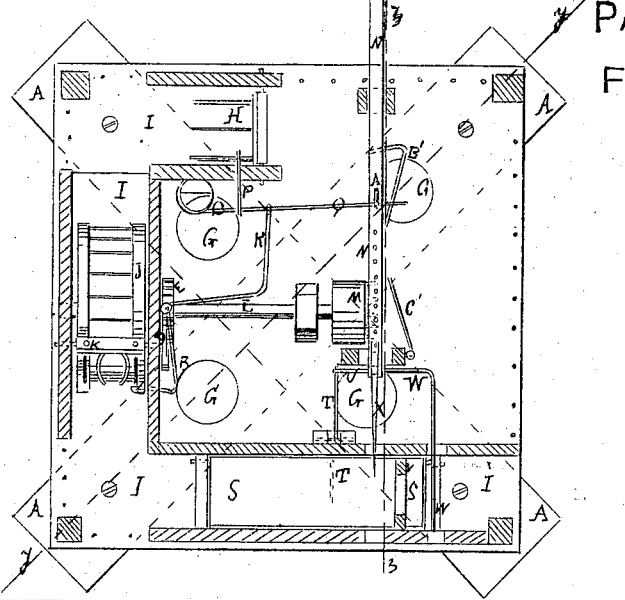
Figure 2:
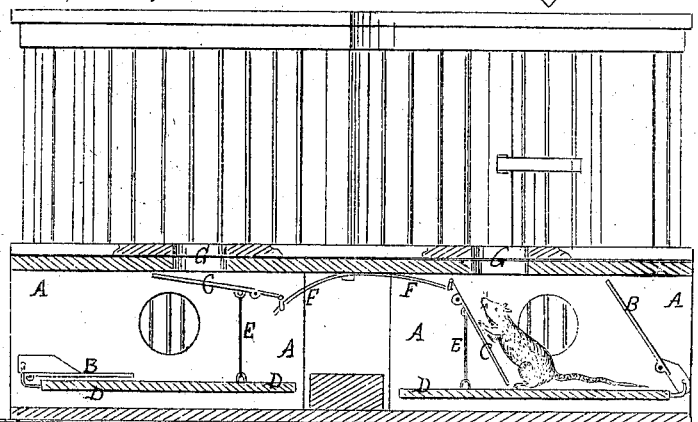
Figure 3:
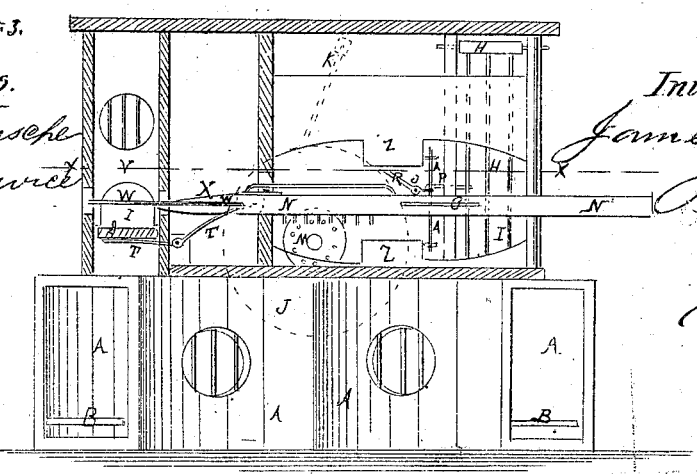

Figure 1 is a horizontal view of my improved trap, taken through the line $x\ x$, Fig. 3. Fig. 2 is a side view, partly in vertical section, through the line $y\ y$, Fig. 1. Fig. 3 is a vertical section of the same, taken through the line $z\ z$, Fig. 1.

Similar letters of reference indicate like parts.

My invention has for its object to furnish an improved trap, so constructed and arranged that the rat, in seeking to reach the bait, shall cage himself, and in seeking to escape will operate mechanism by the action of which he will be killed and thrown from the trap, leaving it set for the next rat; and it consists in the combination of the trap and pivoted doors, by which the rat is caged, with each other and with the entry-box, and in the combination and arrangement of the apparatus by which the animal is killed and thrown from the trap.

A are the entry-boxes of the trap, one or more of which may be used, according to the size of the trap. B is a door pivoted to the lower part of the sides of the entry-box A, near its outer opening. C is a door pivoted to the upper part of the sides of the box A, near its inner opening, as shown in Fig. 2. D is a trap-platform, the outer end of which is pivoted to the outer end of the door B, and its inner end is pivoted near the inner end of the door C by means of the connecting-rod E. F are springs, which, when the doors B, C, and D are left free, hold the door C up against the top of the box A, and the door B down upon the door or platform D, so that the animal can see through the entry-box.

The bait is placed at the inner end of the entry-box A, to reach which the animal enters the box. As soon as he steps from the door B upon the trap D his weight lowers the door C and raises the door B, so that his only way of escape is through the hole G into the upper part of the trap. As soon as he has passed through the opening G, the spring F brings the doors and trap-platform into their former position, ready for the next animal. The animal now finds himself in an apartment from which he can only escape by raising the drop-gate H and passing through into the winding passage-way I. Passing along this, he comes to the tramp-wheel J, over which he attempts to pass. Above and upon the other side of the wheel J is a drop-gate, K, which is so constructed that he can get his head through, but cannot pass through. In trying to get through he operates the wheel J, the shaft L of which passes into the interior of the trap, and has a cog-wheel, M, attached to its inner end, the teeth of which mesh into the rack-teeth formed upon or attached to the bar N, so that as the wheel J is operated the bar N will be drawn back, compressing the spring O, by the elasticity of which the said bar is thrust forward when released.

The shaft L is held in any position to which it may be revolved by the pawl D' taking hold of the teeth of the ratchet-wheel E', attached to said shaft.

P is a rod attached to the wire spring O, the end of which passes through the partition-wall of the passage-way I in such a position that as the said spring O is drawn back it will be forced forward, so as to fasten the gate H shut. R is a bent lever, one end of which is attached to the spring O, and its other end passes through the partition-wall of the passage-way I in such a position as to fasten the gate K closed, so that when the bar N has been drawn back the gate K will be unfastened, and the rat can raise the said gate and pass through. S is a trap-door or fall, forming a portion of the floor of the passage-way I, and which is pivoted at its rear edge to the wall of the trap, and is supported in a horizontal position by the end of the lever T, the other end of which extends inward into such a position as to be operated by an arm, U, attached to the shaft N, so that as the bar N is drawn back the drop S will be raised into a horizontal position, and as the said bar is thrust forward the said drop will be allowed to fall. V is a cross-partition placed in the passage-way I, and having an opening formed through its lower part of such a size as to allow the rat to pass through it.

As the rat, standing upon the drop S, attempts to pass through the opening in the partition V, his head strikes against the bent arm W, the other end of which is attached to the bar N, and pushes the said bar out of gear with the cog-wheel M. The spring O immediately thrusts it forward, driving the knife or spear-head X through the rat, killing him. The drop S at the same time falls, dropping the dead rat outside of the trap.

The knife-blade X is pivoted to the end of the bar N, so that the weight of the dead rat may draw it downward, allowing him to slide easily from the knife, which is immediately raised again to a horizontal position by the spring Y.

Z are guide-plates attached to the frame of the trap, along one side of which the arms A', attached to the bar N, pass when the said bar is being drawn back, holding it in gear with the cog-wheel M, and along the other side of which the arms A' pass when the said bar is being thrown forward, holding it out of gear during its forward movement. The bar N at the end of its stroke is thrown into gear with the gear-wheel M by the inclined arm B' striking against the spring C', attached to the frame of the trap.

What I claim as new, and desire to secure by Letters Patent, is—

1. The combination of the tramp-wheel J, shaft L, cog-wheel M, and toothed bar N, having a knife or spear, X, pivoted to its end, and spring O, with each other, substantially as herein shown and described, and for the purpose set forth.

2. The combination of the drop-gate K, bent lever R, and spring O with each other and with the tramp-wheel J, substantially as herein shown and described, and for the purpose set forth.

3. The combination of the trap-door S, lever T, arm U, and bar N with each other, substantially as herein shown and described, and for the purpose set forth.

4. The combination of the arm W with the bar N, substantially as herein shown and described, and for the purpose set forth.

5. The combination of the arms A' and guide-plates Z with the bar N and frame of the trap, substantially as herein shown and described, and for the purpose set forth.

6. The combination of the inclined guide B' and spring C' with the bar N and frame of the trap, substantially as herein shown and described, and for the purpose set forth.

Witnesses:
W. T. SINCLAIR,
JOHN WALTON.

JAMES A. SINCLAIR.